(12) United States Patent
Vrazic et al.

(10) Patent No.: US 8,803,594 B2
(45) Date of Patent: Aug. 12, 2014

(54) DEVICE FOR ELECTROMAGNETIC NOISE REDUCTION IN A HYBRID AUTOMOTIVE VEHICLE, ASSEMBLY AND ELECTROMAGNETIC NOISE REDUCTION PROCESS IN A HYBRID AUTOMOTIVE VEHICLE

(75) Inventors: Sacha Vrazic, Paris (FR); Tristan Poinsard, Canne (FR)

(73) Assignee: Aisin Seiki Kabushiki Kaisha, Kariya-Shi (JP)

( * ) Notice: Subject to any disclaimer, the term of this patent is extended or adjusted under 35 U.S.C. 154(b) by 52 days.

(21) Appl. No.: 13/512,443

(22) PCT Filed: Nov. 25, 2010
(Under 37 CFR 1.47)

(86) PCT No.: PCT/JP2010/006870
§ 371 (c)(1),
(2), (4) Date: Dec. 10, 2012

(87) PCT Pub. No.: WO2011/064996
PCT Pub. Date: Jun. 3, 2011

(65) Prior Publication Data
US 2013/0120057 A1 May 16, 2013

(30) Foreign Application Priority Data
Nov. 30, 2009 (FR) .................................... 09 58492

(51) Int. Cl.
*H03B 1/00* (2006.01)
(52) U.S. Cl.
USPC ........................................................ 327/551
(58) Field of Classification Search
USPC ........................................ 327/551, 552, 553
See application file for complete search history.

(56) References Cited

U.S. PATENT DOCUMENTS

| 4,856,084 A | 8/1989 | Richards, Jr. |
| 5,189,415 A | 2/1993 | Shimada et al. |
| 5,519,889 A * | 5/1996 | Hipp .............................. 455/297 |
| 7,020,549 B2 * | 3/2006 | Nakaya et al. ................... 701/36 |
| 7,589,432 B2 * | 9/2009 | Kawasaki et al. ............. 307/10.1 |
| 7,848,707 B2 * | 12/2010 | Patel ........................... 455/67.13 |
| 2006/0030287 A1 | 2/2006 | Vanderhelm et al. |

FOREIGN PATENT DOCUMENTS

| DE | 102 02 635 B4 | 8/2003 |
| EP | 0 779 196 A1 | 6/1997 |
| EP | 1 411 633 A2 | 4/2004 |
| JP | 63-158929 A | 7/1988 |

(Continued)

OTHER PUBLICATIONS

International Search Report for PCT/JP2010/006870 dated Feb. 28, 2011.

(Continued)

*Primary Examiner* — Jeffrey Zweizig
(74) *Attorney, Agent, or Firm* — Sughrue Mion, PLLC

(57) ABSTRACT

A device for electromagnetic noise reduction in a hybrid automotive vehicle includes at least one sensor that measures a conducted noise generated by at least one noise source, a reducer that reduces a radiated noise, referred to as modified, on a signal of interest made noisy by the modified radiated noise, where the reducer includes a determiner that determines the noise corrected signal of interest from a noisy signal of interest, where the determiner includes an estimator that estimates the modified radiated noise from the conducted noise, and a selector that selects a frequency for receiving a radiofrequency signal.

8 Claims, 13 Drawing Sheets

(56) References Cited

FOREIGN PATENT DOCUMENTS

| | | |
|---|---|---|
| JP | 04177919 A | 6/1992 |
| JP | 5-211451 A | 8/1993 |
| JP | 6-315259 A | 11/1994 |
| JP | 08335915 A | 12/1996 |

OTHER PUBLICATIONS

French Preliminary Search Report for FR 0958492 dated Jun. 11, 2010.

Office Action issued on Jan. 22, 2014 in Japanese Patent Application No. 2012-524957.

* cited by examiner

DEVICE FOR ELECTROMAGNETIC NOISE REDUCTION IN A HYBRID AUTOMOTIVE VEHICLE, ASSEMBLY AND ELECTROMAGNETIC NOISE REDUCTION PROCESS IN A HYBRID AUTOMOTIVE VEHICLE

CROSS REFERENCE TO RELATED APPLICATIONS

This application is a National Stage of International Application No. PCT/JP2010/006870 filed Nov. 25, 2010, claiming priority based on French Patent Application No. 0958492 filed Nov. 30, 2009, the contents of all of which are incorporated herein by reference in their entirety.

TECHNICAL FIELD

The present invention relates to electromagnetic noise reduction, especially in the automobile domain and more specifically that of hybrid vehicles.

BACKGROUND ART

Automobiles including a high-power energy converter are known. Such a converter forms a source of noise which can propagate by radiation and conduction. In fact a converter includes high switching speed electronic components which generate broadband noise. Conducted noise travels in the cables and structure of the vehicle. The radiated noise propagates as an electromagnetic wave.

SUMMARY OF INVENTION

Technical Problem

The radiated electromagnetic wave disturbs a signal, referred to as of interest, going to a receiving antenna of the vehicle. Thus this signal of interest is corrupted by the radiated electromagnetic noise.

Such a noise source leads to a comfort problem because it disturbs radio reception in the vehicle.

The purpose of the invention is to improve the comfort of the users of the vehicle.

Solution to Problem

To that end, the object of the invention is a device for electromagnetic noise reduction in a hybrid automotive vehicle, comprising:
 at least one sensor for measurement of a conducted noise generated by at least one noise source
 a reduction unit for a radiated noise, referred to as modified, on a signal of interest made noisy by the modified radiated noise, where the reduction unit comprises means for determination of the noise corrected signal of interest from the noisy signal of interest, where the means of determination include means for estimation of the modified radiated noise from the conducted noise.

The device according to the invention makes it possible to cancel the noise from the signal of interest and thereby eliminate the problems related to the comfort of the users of the vehicle. Actually, the conducted noise measured by the sensor makes it possible to first estimate the radiated noise because the measured conducted noise is an image of all or part of the radiated noise. It is therefore possible to estimate the radiated noise from the conducted noise and therefore to determine the noise corrected signal of interest from the conducted noise and the noisy signal of interest.

Furthermore, the radiated noise can be modified by the environment of the vehicle, the frame of the vehicle, in particular. Therefore, the noise initially radiated by the noise source, called initial radiated noise, is different from the radiated noise, called modified radiated noise, which actually disturbs the receiver antenna. With the means for estimating the modified radiated signal from the conducted noise, the signal of interest is noise corrected for the modified noise actually disturbing the antenna receiving the signal of interest.

Furthermore, the environment modifying the initial noise has properties which are substantially constant over time and unaffected by the signals and the noise. The signal and the noise can be either quasi-stationary or even stationary or slowly varying (non-stationary). The device allows for continuously estimating a transfer function between the conducted noise and the radiated noise in order to constantly adapt to the possible variations of the environment of the device.

According to another optional feature, the sensor includes a Rogowski type coil.

Such a sensor is only sensitive to conducted noise.

Generally, the conducted noise source includes an energy or direct-direct converter comprising switching components generating a signal with harmonics over a relatively broad frequency band. The radiated noise is also generated by the converter. The radiated noise is emitted by the conductors of the signal emitted by the converter. Upon passage of the signal emitted by the converter, these conductors form an antenna emitting the initial radiated noise.

The converter generates a signal ranging from direct current up to the frequency band corresponding to the AM band (amplitude modulation), and even beyond that. The low-frequency components, referred to as energy frequencies, of the noise have a very high power. These energy frequencies completely mask the noise in the AM band where the noise power is relatively weak. However, the noise power in the AM band is sufficiently strong to corrupt the vehicle reception antenna. It is therefore preferable to get a good measurement of the noise in the frequency band of the signal of interest to be noise corrected, meaning in the frequency band above the energetic frequencies. Such a coil acts as a high pass filter with a cutoff frequency which is relatively low and below 500 kHz. Thus, the sensor only measures the frequencies included in a set frequency range and higher than the energetic frequencies which are not of interest.

Furthermore, such a coil is linear in the amplitude modulation (AM) radio reception band and is not saturated by the current that it measures despite the high value that this current could have.

Additionally, such a coil is sensitive to low amplitude signals, and therefore to the noise.

Further, since an automobile includes many electronic components using high currents, a sensor containing a ferromagnetic material would saturate and would have a nonlinear behaviour with hysteresis.

A Rogowski type coil does not have these disadvantages because it only includes a toroid containing a dielectric material, or an air toroid.

Advantageously, the means for estimating the modified radiated noise from the conducted noise include an adaptive filter.

Such a filter for example is the Wiener type filter and is particularly suited for noise correction, especially when the signals and the noise are quasi-stationary, or even stationary or slowly varying.

According to another optional feature of the device, it includes means for conversion of the noisy signal of interest and/or conducted noise measured in an analogue mode into a digital mode, where the means of conversion are arranged upstream of the means for determining the noise corrected signal of interest.

The change from analogue to digital mode and also the use of a sub-sampling technique makes it possible to reduce the quantity of data to be handled, and the time for processing the noisy signal of interest by the determination means.

According to other optional features of the device:

the device includes means for selecting a receiving frequency for radiofrequency signals. These means of selection comprise in particular a radio tuner. They enable the frequency of the desired radio station to be selected.

The device includes means for mixing the noisy signal of interest and/or the measured conducted noise and/or the noise corrected signal of interest with a conversion signal having a conversion frequency, into a noisy intermediate signal of interest and/or a measured conducted intermediate noise and/or a noise corrected intermediate signal of interest having a single intermediate frequency. In the case where the signal is converted to digital mode, the noisy intermediate signal of interest can be obtained by simple multiplication. This in particular avoids the use of nonlinear analogue components.

Another advantage is the improvement of the frequency selectivity of the filtering. Actually, since the bandwidth increases with the frequency, it is easier to filter and obtain good selectivity by using the noisy intermediate signal of interest which has a frequency below the frequency or frequencies of the noisy signal of interest.

Means for mixing and means for selection are shared.

In the case where the device for receiving the noisy signal of interest is a radio tuner, the various frequencies such as those of different radio stations are converted into a single intermediate frequency. Therefore, the various stations can always be received by simply adjusting the conversion frequency.

In this case, the means of mixing provide the radio tuner function.

Advantageously, the means of selection and/or the means of mixing are arranged downstream of the determination means for the noise corrected signal of interest. Thus the noise correction is performed before the receiving frequency for the radiofrequency signal or the conversion frequency is selected, especially when a very high radiated noise level is involved.

The object of the invention is also an electromagnetic noise reduction process in a hybrid automotive vehicle, in which:

at least one conducted noise generated by at least one noise source is measured;

a radiated noise, referred to as modified, on a signal of interest made noisy by the modified radiated signal, is estimated from the conducted noise, where the modified radiated noise is obtained from the radiated noise, referred to as initial, generated by the noise source and modified by the device environment, and the noise corrected signal of interest is determined from the noisy signal of interest and the estimate of the modified radiated noise.

Another object of the invention is an assembly comprising:

at least one noise source with an energy converter and a DC-DC converter;

at least one noise reduction device as defined above including at least one conducted noise sensor between the energy converter and the DC-DC converter and at least one conducted noise sensor between the energy converter and an electric motor.

The object of the invention is also a vehicle comprising a noise reduction device as defined above or an assembly as defined above.

The invention will be better understood by reading the following description, given solely as a non limiting example and referring to the following drawings.

DESCRIPTION OF EMBODIMENTS

Figure 1:
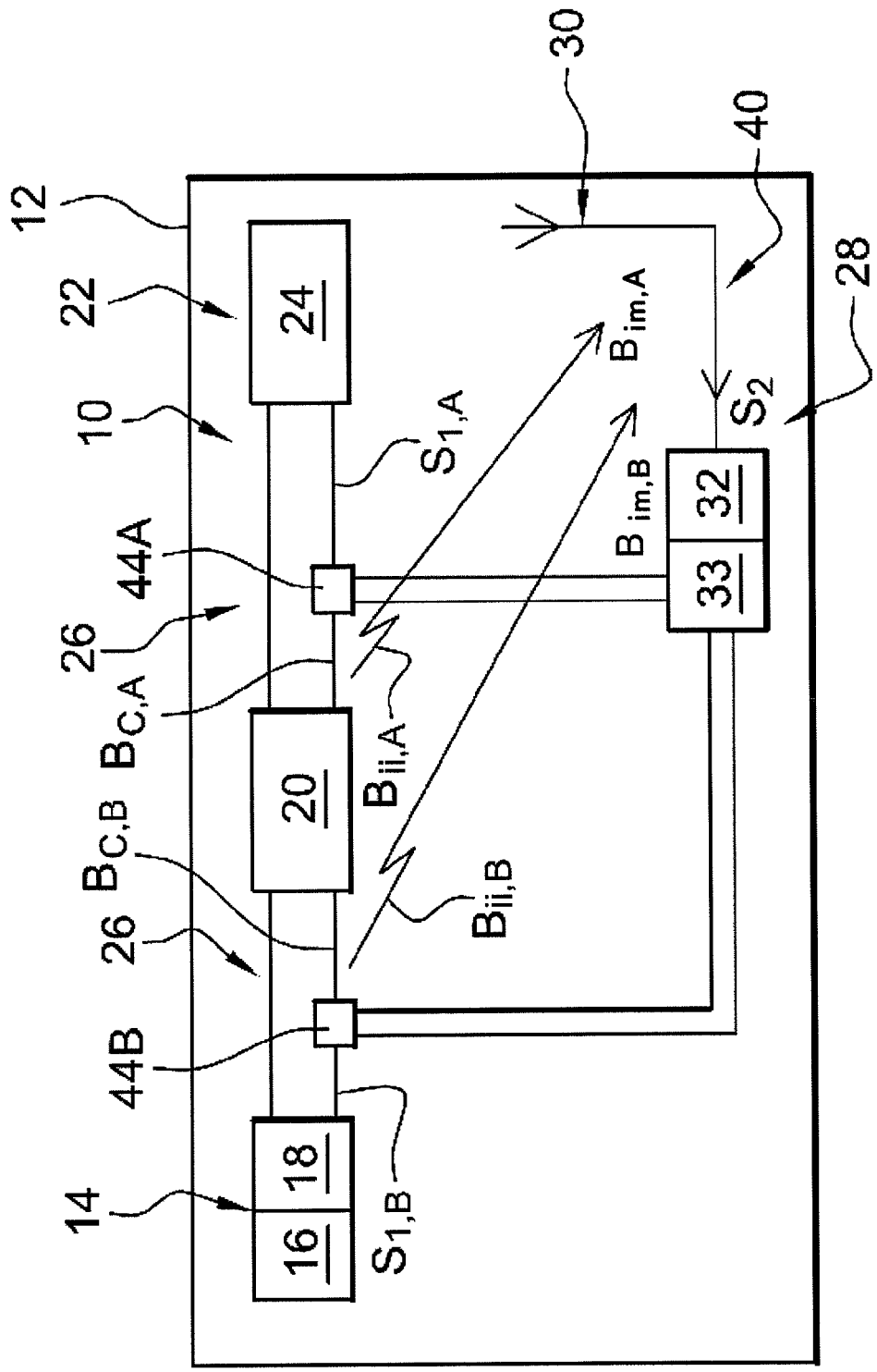
FIG. 1 shows schematically various functional units of a vehicle including a noise reduction device in accordance with the invention.

FIG. 1 shows a drawing of an electric installation 10 within a vehicle 12. The vehicle 12 is a hybrid.

The vehicle 12 includes an electric energy source 14 with a battery 16. The vehicle 12 also includes two noise sources comprising respectively a DC-DC voltage converter 18 and an energy converter 20. Each source 18, 20 generates noise which is electromagnetically conducted and radiated. The vehicle 12 also includes at least one device 22 that includes in particular an electric portion 24 of the vehicle motor which furthermore comprises a combustion portion (not shown). Reference signals $S_{1,A}$ and $S_{1,B}$ travel respectively between both the source 20 and the device 22 and also the source 20 and the source 18.

The sources 18 and 20 generate both a conducted noise, respectively $B_{C,A}, B_{C,B}$, transmitted by the means 26 and also initial noises, referred to as radiated, respectively $B_{ii,A}$, $B_{ii,B}$, emitted by the means 26 as electromagnetic waves. The initial radiated noises are modified by the installation environment 10, here the frame of the vehicle 12. Thus, the modified radiated noises $B_{im,A}$, $B_{im,B}$ are obtained respectively from the modified radiated noises $B_{ii,A}$ and $B_{ii,B}$.

The noise sources 18, 20 and the device 22 are connected to each other by the means 26 for wired transmission of the signals $S_{1,A}$, $S_{1,B}$ which conduct respectively conducted noises $B_{C,A}$, $B_{C,B}$ and which flow respectively from source 18 to source 20 and from source 20 to the device 22.

The vehicle 12 also includes a device 28 for receiving electromagnetic waves including an antenna 30, a tuner 32 for amplitude modulation (AM) waves in a frequency band ranging from 535 kHz to 1605 kHz and a unit 33 for reduction of the modified radiated noise $B_{im,A}$, $B_{im,B}$ on a noisy signal of interest $S_2$ flowing from antenna 30 to tuner 32 and unit 33.

The antenna 30 is connected to the tuner 32 and the noise reduction unit 33 by the means 40 of wired transmission of the noisy signal of interest $S_2$.

The installation 10 also includes two sensors 44A, 44B respectively for the conducted noises $B_{C,A}$, $B_{C,B}$ generated by the sources 18, 20 respectively on the reference signals $S_{1,A}$, $S_{1,B}$.

Figure 2:
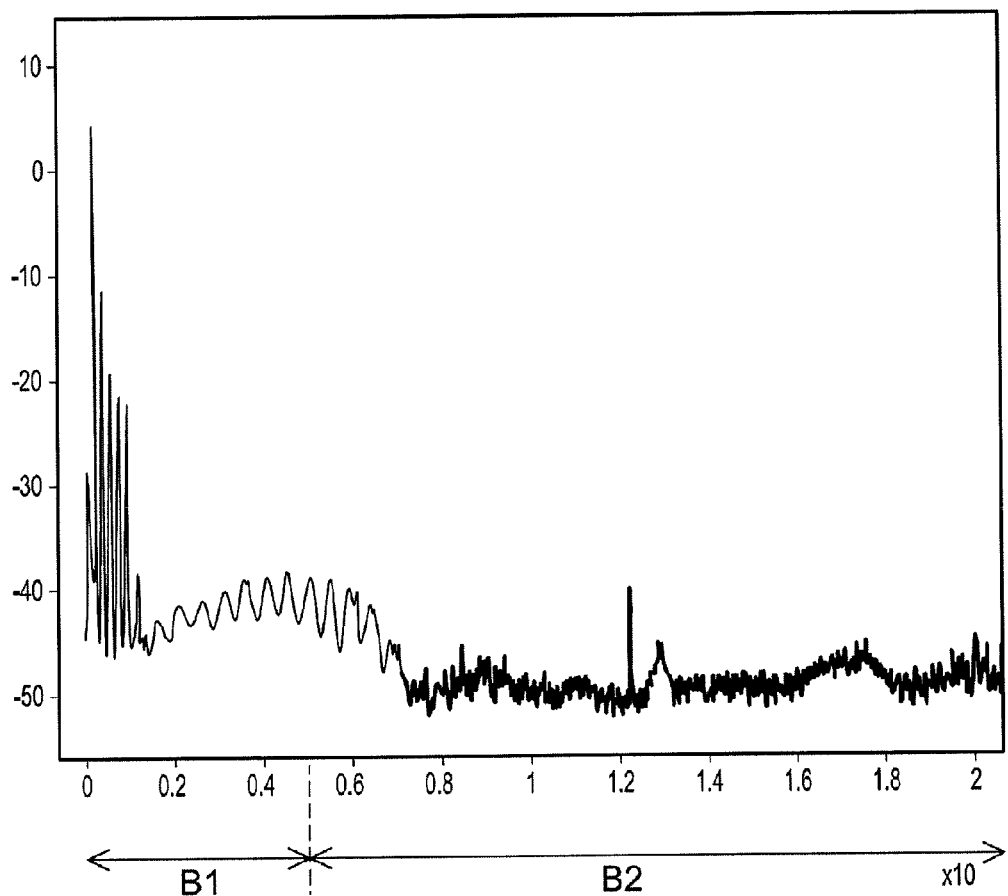
FIG. 2 shows variations of the spectral energy density of a noisy signal of interest as a function of frequency.

FIG. 2 shows a spectral energy density of the noisy signal of interest $S_2$. The spectral energy density represents the energy variation as a function of the frequency. Two frequency bands B1, B2 are distinguished. Band B1 corresponds to frequencies substantially ranging from 0 to 500 kHz and band B2 corresponds to frequencies substantially ranging from 500 kHz to 2 MHz. Band B2 corresponds to the amplitude modulation (AM) radio receiving frequency band. FIG. 2 illustrates the variations of the noisy signal of interest $S_2$ including the noisy signal of interest $S_3$ and the modified radiated noises $B_{im,A}$, $B_{im,B}$ which are represented by amplitude artefacts which are relatively small compared to the amplitude of the signal $S_2$ or $S_3$. In other terms, $S_2=S_3+B_{im,A}+B_{im,B}=S_3+B_{im}$ where $B_{im}$ is a function of the modified radiated noises $B_{im,A}$, $B_{im,B}$ and therefore represents all the modified radiated noises. A total measured conducted noise $B_C$ is also defined which is a function of $B_{C,A}$, $B_{C,B}$ and which therefore represents all the conducted noises.

Figure 3:
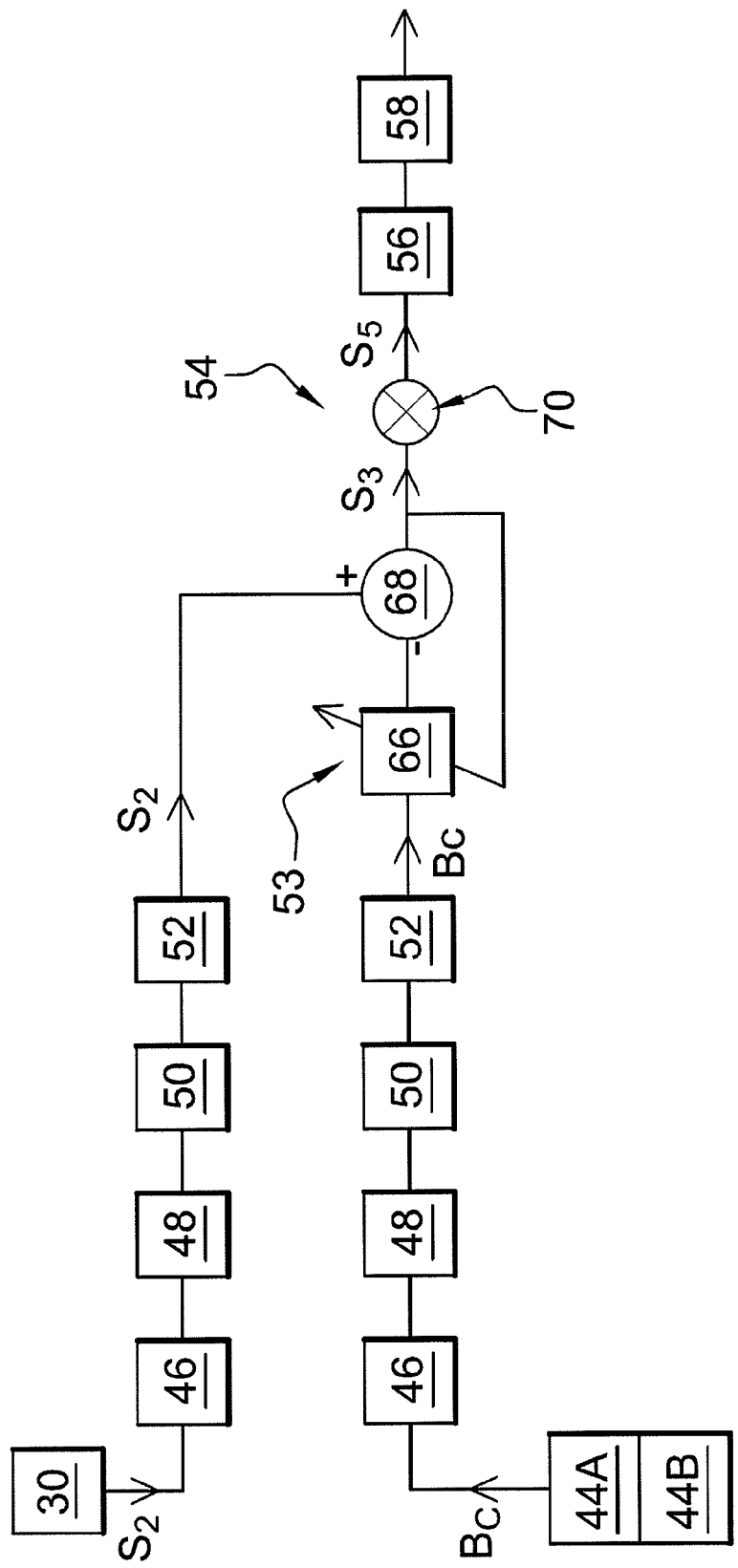
FIG. 3 shows schematically the noise reduction device from FIG. 1 in accordance with a first embodiment.

Referring to FIG. 3, the unit 33 includes a bandpass filter 46 and also the means 48 of conversion (ADC) of the conducted noise $B_C$ and the noisy signal of interest $S_2$ from analogue to digital. The means 48 of conversion have a sampling frequency $F_e$ substantially equal to twice a maximum frequency $F_i$ of the radiated noise from sources 18, 20. In the case at hand, Fe=10 MHz where $F_i$<5 MHz.

The unit 33 also includes the means 50 for reducing the sampling rate, and a bandpass filter 52 placed downstream of the means 50. Furthermore, the unit 33 includes the means 53 for noise correction of the noisy signal of interest $S_2$. The unit 33 includes the means 54 of frequency processing of the noise corrected signal of interest $S_3$, the means 56 for conversion (DAC) of the noise corrected signal of interest $S_3$ from digital to analogue, and means 58 for demodulation of the noise corrected signal of interest $S_3$. The means 48 of conversion are positioned upstream of the means 53.

The means 54 of frequency processing are arranged downstream of the means 53 for determining the noise corrected signal of interest $S_3$.

Figure 4:
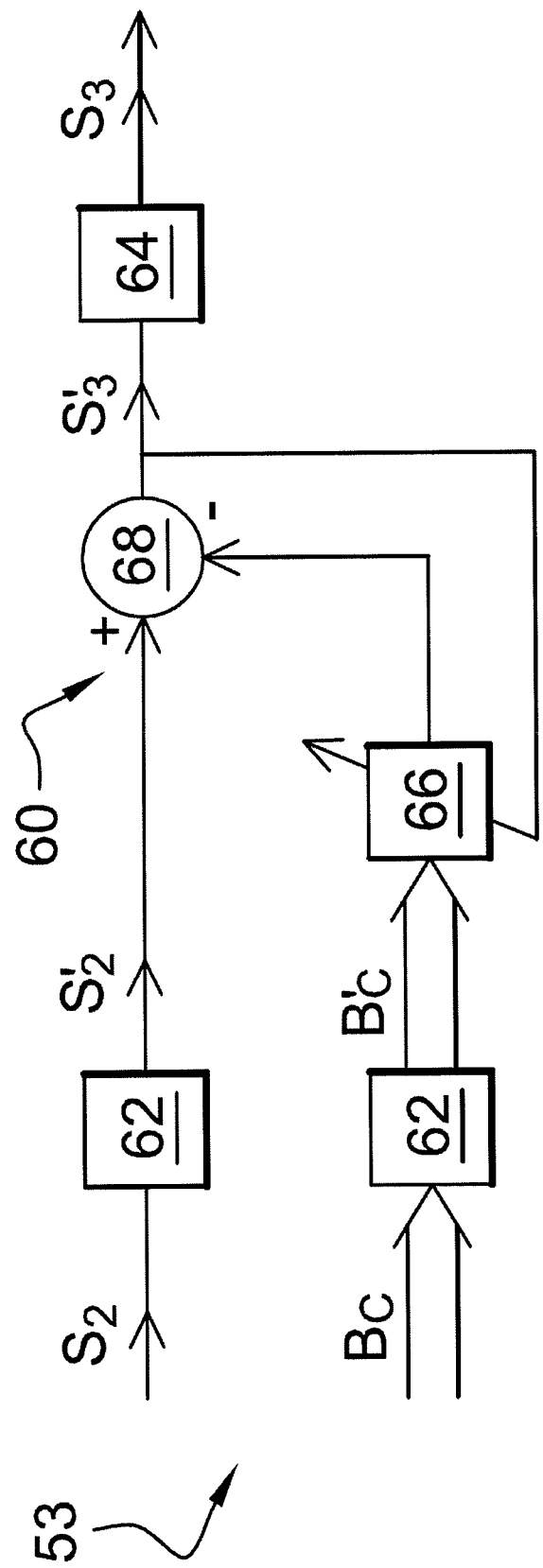
FIG. 4 shows schematically a part of the noise reduction device from FIG. 3.

Referring to FIG. 4, the means 53 include the means 60 for determining the noise corrected signal of interest $S_3$ from the noisy signal of interest $S_2$ and the conducted noise $B_C$. The means 53 also include the means 62, 64 of frequency processing of the signals arranged respectively upstream and downstream of the means 60.

The means 62 comprise two Fast Fourier Transform units for the noisy signal of interest $S_2$ and the conducted noises $B_{C,A}$, $B_{C,B}$ forming a total conducted noise $B_C$ into respectively signals $S_2'$ and $B_C'$. The means 64 include an inverse fast Fourier transform unit for the transformed noise corrected signal $S_3'$ into the noise cancel signal $S_3$.

The means 60 include means 66 for estimation of the total modified radiated noise $B_{im}$, meaning the modified radiated noises $B_{im,A}$, $B_{im,B}$ from the total conducted noise $B_C$, meaning the conducted noises $B_{C,A}$, $B_{C,B}$. The means 60 also include means 68 for subtraction of the estimated modified radiated noise $B_{ime}$, meaning the modified radiated noise $B_{ime,A}$, $B_{ime,B}$ estimated by the means 66, from the noisy signal of interest $S_2$. Thus, means 60 perform the following operation: $S_3'(t)=S_2'-B_{ime}+f(S_3'(t-1))=S_2'-(B_{ime,A}+B_{ime,B})+f(S_3'(t-1))$. In this case, means 66 include a Wiener type adaptive filter with multiple noise reference.

The means 54 for frequency processing include means 70 for mixing the noise corrected signal of interest $S_3$ with a conversion signal $S_4$ having a single conversion frequency $F_4$ into a noise corrected intermediate signal of interest $S_5$ with single intermediate frequency $F_5$. In this case, the means 70 comprise an IF (Intermediate Frequency) type converter. The means 70 form the means for selection of frequency $F_5$ for receiving a radiofrequency signal by the receiving device 32 from the noisy signal of interest $S_2$. The means for selection and the means for mixing are shared. As a variant, they are distinct.

The vehicle 12 therefore includes a noise reduction device including the sensors 44A, 44B and the unit 33 including the means 60 including means 66. This device enables the reduction in radiated electromagnetic noise according to the following sequence of steps:

The sources 18, 20 generate the conducted noises $B_{C,A}$, $B_{C,B}$ and the initial radiated noises $B_{ii,A}$, $B_{ii,B}$.

The noises $B_{ii,A}$, $B_{ii,B}$ are modified by the environment of the vehicle into respectively $B_{im,A}$, $B_{im,B}$ modified radiated noises.

The conducted noises $B_{C,A}$, $B_{C,B}$ and the signal of interest $S_2$ are all measured. The number of noises $B_C$ depends on the number of sources of noise in the vehicle.

Thus, one conducted noise sensor corresponds to each source.

The conducted noises $B_{C,A}$, $B_{C,B}$ and the signal of interest $S_2$ are all three processed successively by filters 46, means 40, 50 and filters 52.

The modified radiated noises $B_{im,A}$, $B_{im,B}$ are then estimated by means 66.

The noise corrected signal $S_3$ is determined by means 68.

The frequency $F_5$ of the noise corrected signal $S_3$ is selected using shared means 54, 70.

The noise corrected signal $S_3$ is finally processed by means 56 and 58.

Figure 5:
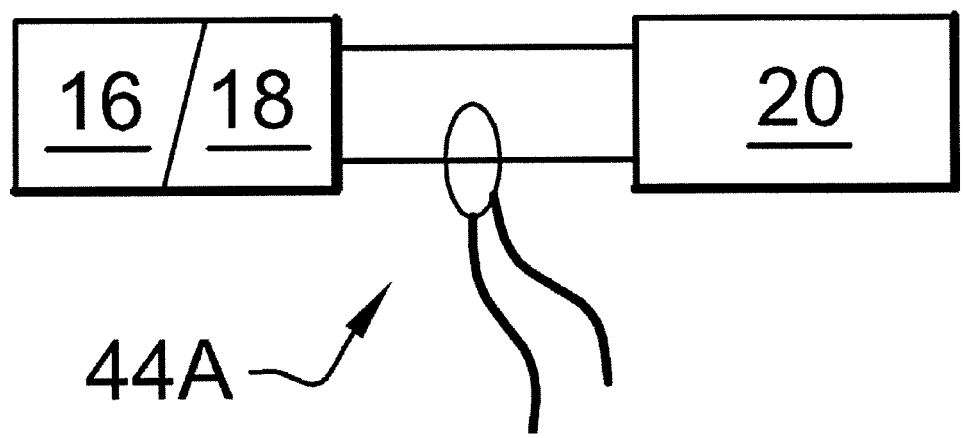
FIG. 5 shows a connection between a DC-DC converter and an energy converter.

Each sensor 44A, 44B is solely sensitive to conducted noises $B_{C,A}$, $B_{C,B}$ and is insensitive to the radiated electromagnetic signals. As shown in FIG. 5, sensor 44A is arranged around a conducting wire of the means of transmission by wire 26 between the battery 16 and converter 18 on one side and the converter 20 on the other side.

Figure 6A:
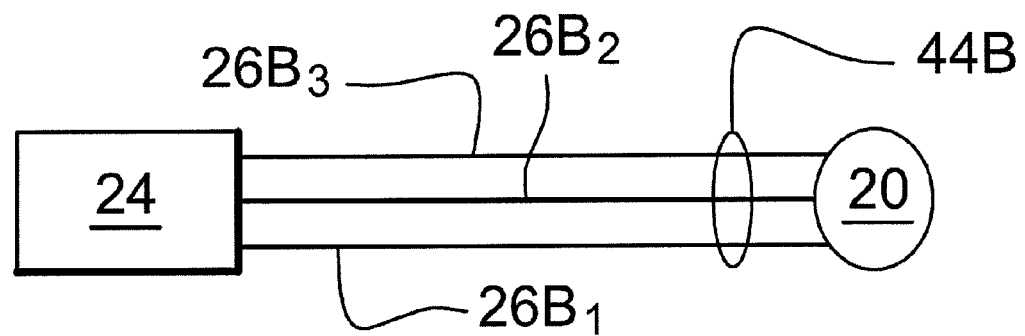
FIG. 6A shows a variant of a connection between an electric motor and an energy converter.

FIG. 6A shows a single sensor 44B. The sensor 44B is arranged around all the conductor phase wires $26B_{1-3}$ between converter 20 and device 22. The conducted noise $B_{C,A}$ is therefore measured simply by means of a single sensor, which is economical.

Figure 6B:
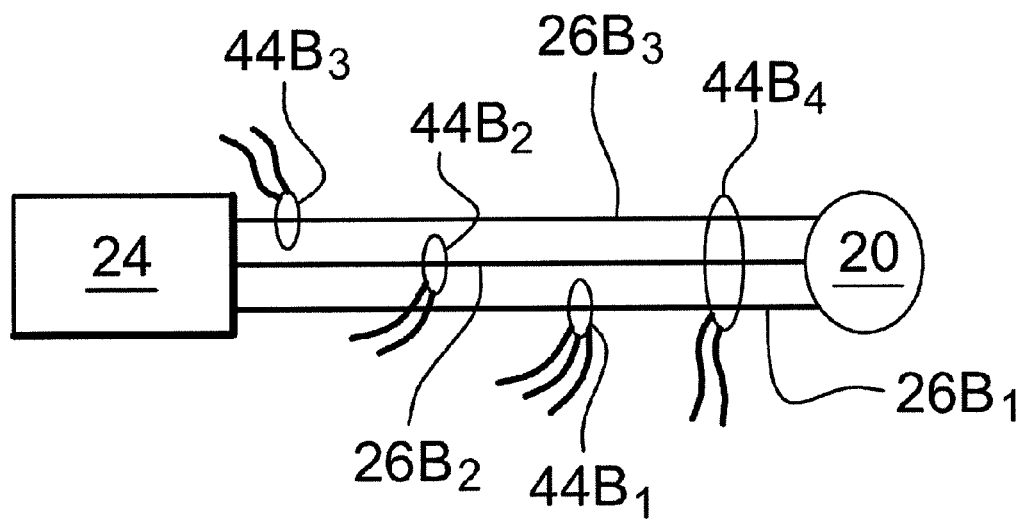
FIG. 6B shows a variant of a connection between an electric motor and an energy converter.

In FIG. 6B a variant is shown in which the sensor 44B includes three sensors 44B$_1$, 44B$_2$ and 44B$_3$. The sensors 44B$_{1-3}$ are identical to each other and each one is arranged around respectively one conductor phase wire 26B$_{1-3}$ of the means 26 between the converter 20 and the device 22. Thus, each noise is measured independently. Also a subsequent processing step is done comprising an adaptive filtering using the measured noises.

Figure 7:
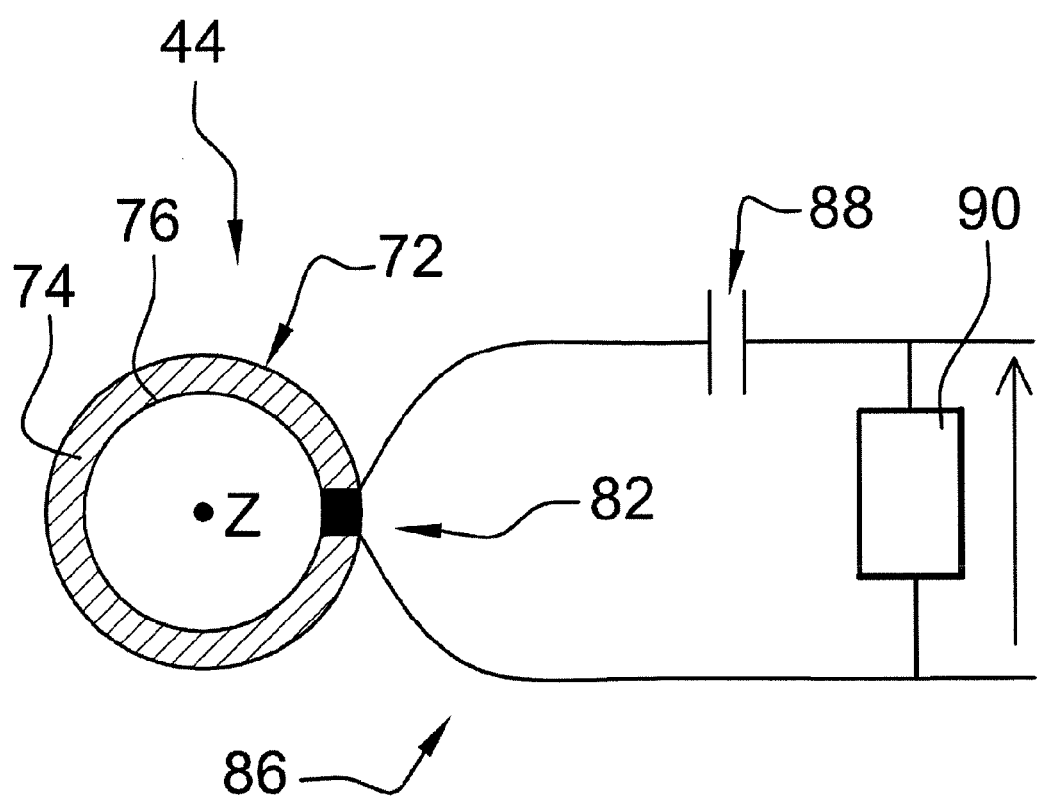
FIG. 7 shows a sensor for the noise reduction device from FIG. 1.
Figure 8:
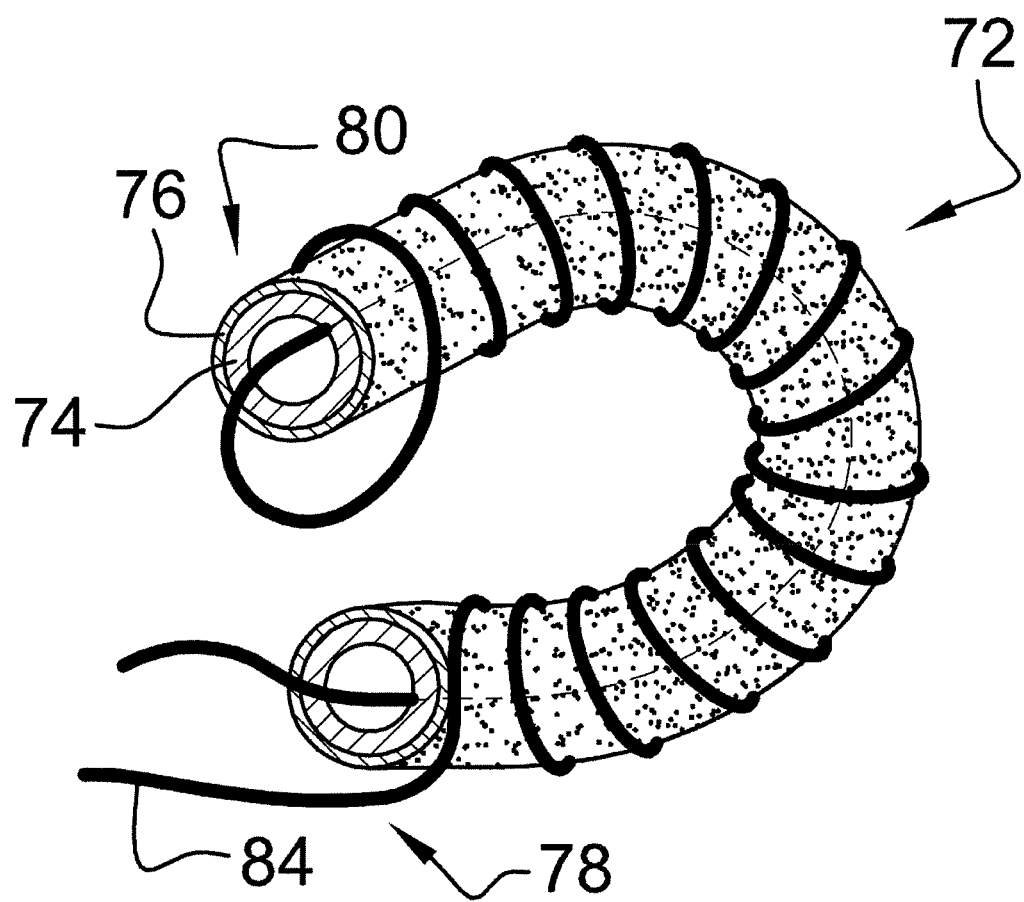
FIG. 8 shows a sensor for the noise reduction device from FIG. 1.
Figure 9:
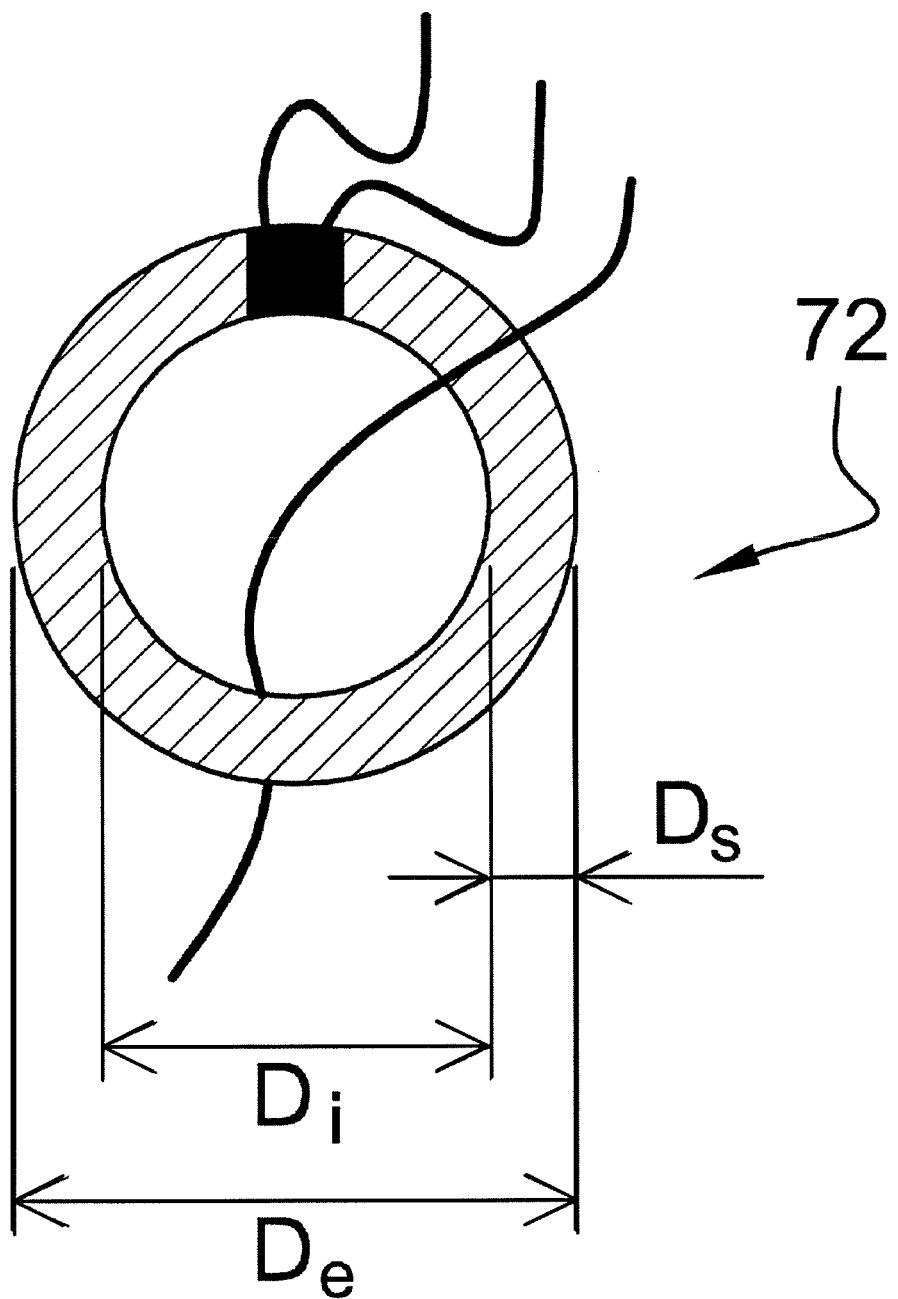
FIG. 9 shows a sensor for the noise reduction device from FIG. 1.

Referring to FIGS. 7, 8 and 9, each sensor 44 includes a Rogowski type coil 72. The coil 72 has a general toroidal shape around an axis Z and includes a hollow toroidal support 75 of dielectric material covered with a protective coating 76 of heat shrink plastic. The coil 72 includes two ends 78, 80 and also a sleeve 82 for connecting of the two ends 78, 80. The coil 72 also includes an insulated electric cable 84 passing inside the toroidal support 74 and wound around the toroidal support. The support 74 of the sensor 44 has external diameter D$_e$ and internal diameter D$_i$ substantially equal respectively to 52 mm and 36 mm. The cross section shows an external diameter Ds of about 8 mm. Each sensor 44 also includes the means 86 for integration of the variations of the signal measured by the coil 72. These means 86 of integration include a capacitor 88 and resistor 90 shown in FIG. 7.

Figure 10:
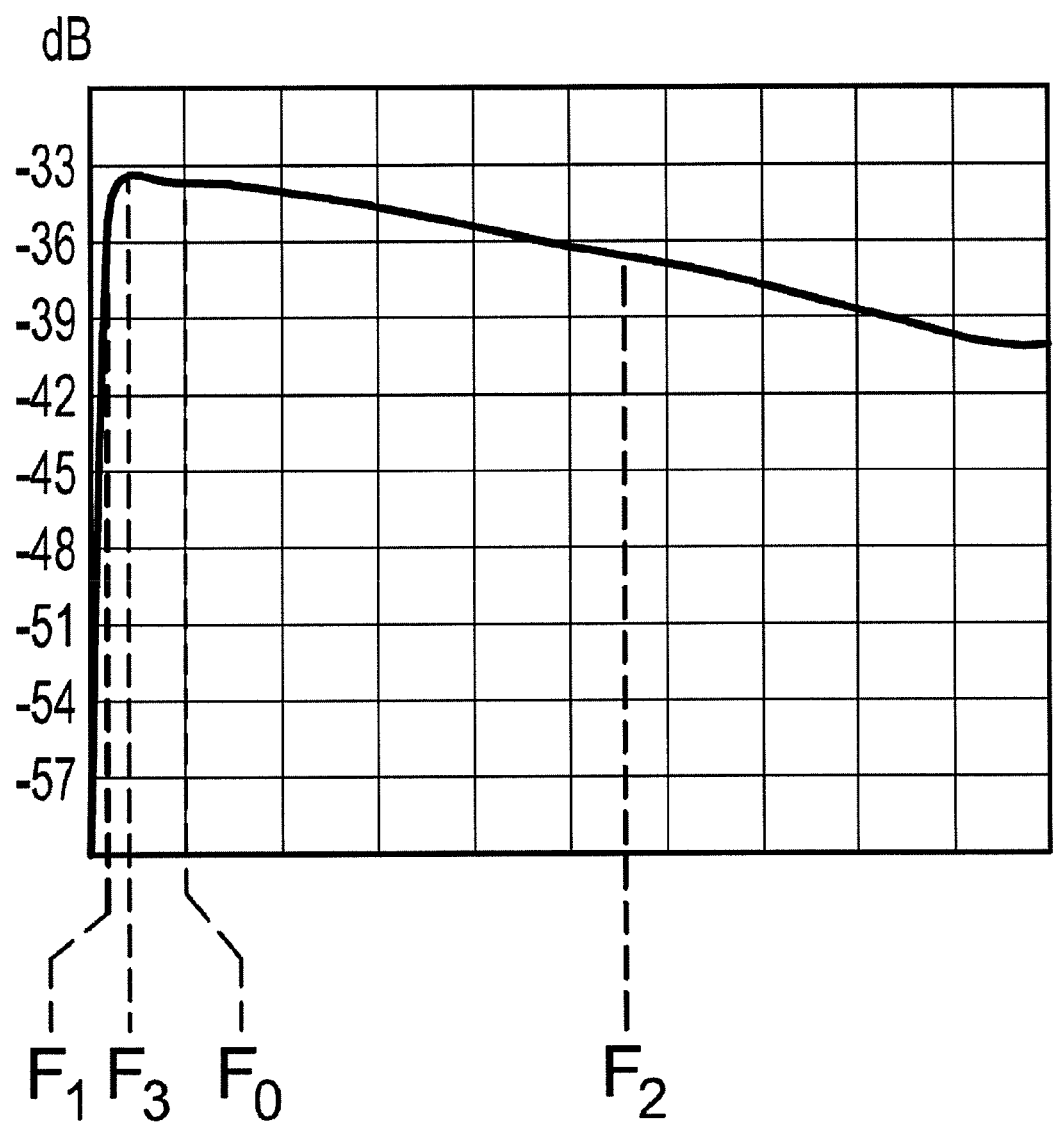
FIG. 10 shows the transfer function curve of the sensors from FIGS. 5 to 9 on which gain variations due to frequency are shown for frequency values ranging from 150 kHz to 20 MHz.

Other features of the coil 72 for the sensor 44A are described in Table 1 below with reference to FIG. 10 in which variations of the gain based on frequency, are shown for frequency values ranging from 150 kHz to 20 MHz.

TABLE 1

| Property | Value |
| --- | --- |
| Sensitivity at 1 MHz | 0.55 V/A |
| Bandwidth R = 20 Ω, C = 22 nF | 10.85 MHz |
| Central frequency F$_0$ | 2.24 MHz |
| Cutoff frequencies F$_1$, F$_2$ | 445 kHz and 11.29 MHz |
| Frequency F$_3$ of maximum gain | 844 kHz |
| Minimum loss in frequency F$_3$ | 33.5 dB |
| Input impedance at 1 MHz | 13.2 Ω |
| Inductance at 1 MHz | 1.42 μH |

Figure 11:
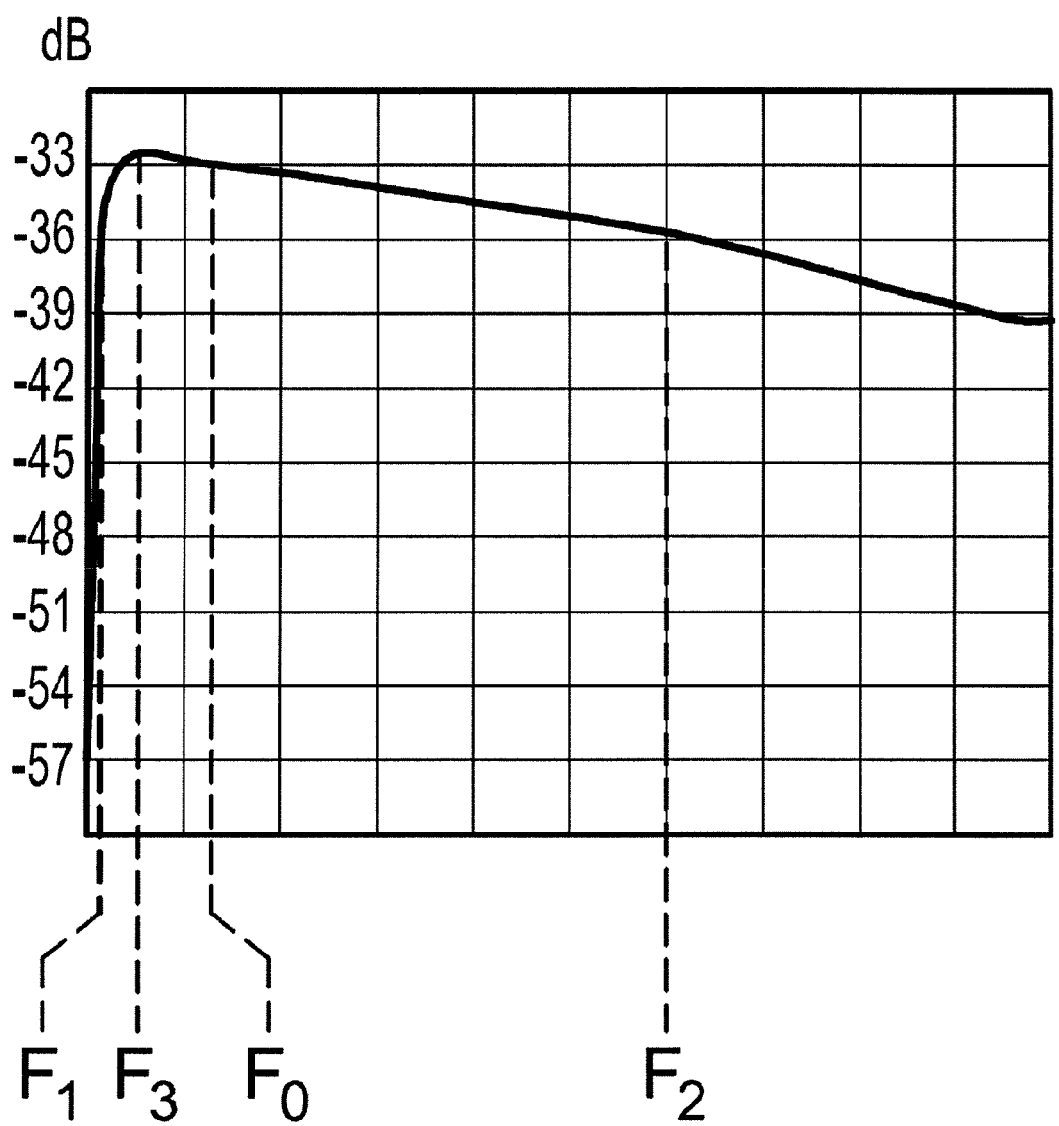
FIG. 11 shows the transfer function curve of the sensors from FIGS. 5 to 9 on which gain variations due to frequency are shown for frequency values ranging from 150 kHz to 20 MHz.

The external diameter D$_e$ and internal diameter D$_i$ of the toroidal support 74 for the sensors 44B$_{1-3}$ are substantially equal to 45 mm and 29 mm respectively. Other features of the coil 72 for the sensors 44B$_{1-3}$ are described in Table 2 below with reference to FIG. 11.

TABLE 2

| Property | Value |
| --- | --- |
| Sensitivity at 1 MHz | 0.5 V/A |
| Bandwidth R = 20 Ω, C = 22 nF | 12.1 MHz |
| Central frequency F$_0$ | 2.5 MHz |
| Cutoff frequencies F$_1$, F$_2$ | 499 kHz and 12.6 MHz |
| Frequency F$_3$ of maximum gain | 1.08 MHz |
| Minimum loss in frequency F$_3$ | 32.7 dB |
| Input impedance at 1 MHz | 15.4 Ω |
| Inductance at 1 MHz | 2.05 μH |

Figure 12:
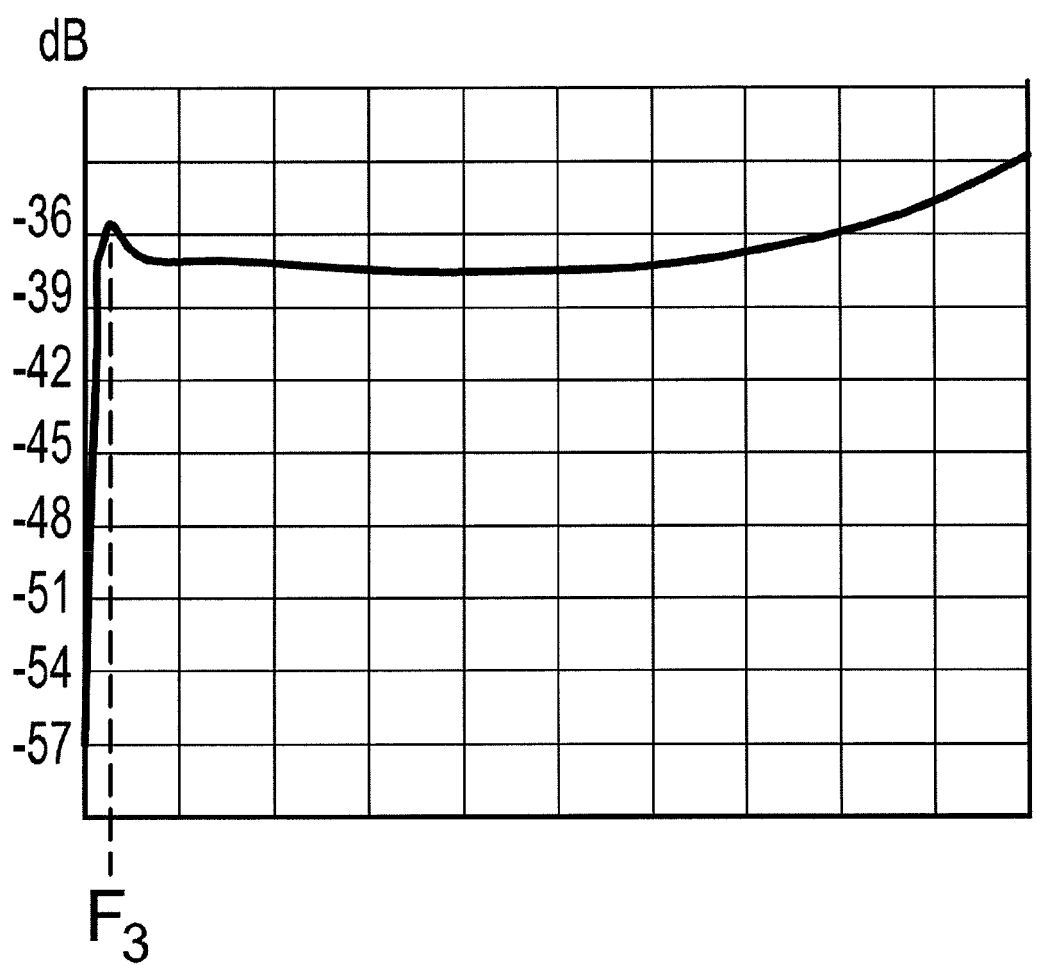
FIG. 12 shows the transfer function curve of the sensors from FIGS. 5 to 9 on which gain variations due to frequency are shown for frequency values ranging from 150 kHz to 20 MHz.

The external diameter De and internal diameter Di of the toroidal support 74 for the sensor 44B$_4$ are substantially equal to 70 mm and 54 mm respectively. Other features of the coil according to the first embodiment are described in Table 3 below with reference to FIG. 12.

TABLE 3

| Property | Value |
| --- | --- |
| Sensitivity at 1 MHz | 0.4 V/A |
| Frequency F$_3$ of maximum gain | 600 kHz |
| Minimum loss in frequency F$_3$ | 35.5 dB |
| Input impedance at 1 MHz | 15.8 Ω |
| Inductance at 1 MHz | 1.3 μH |

Figure 13:
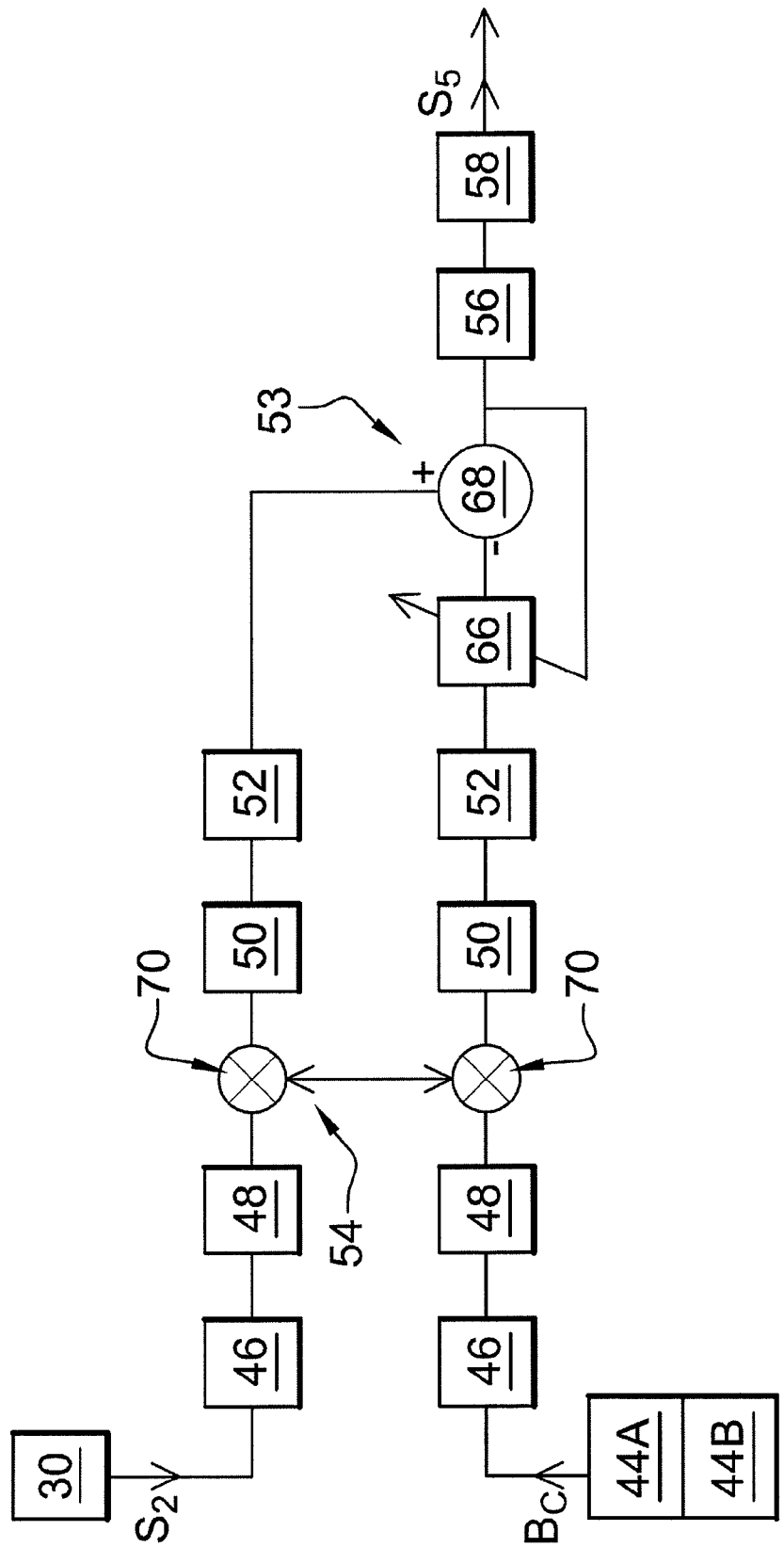
FIG. 13 shows schematically a noise reduction device in accordance with a second embodiment.

FIG. 13 shows an installation according to a second embodiment. Elements similar to those shown in the previous Figs. are designated using the same references.

In this embodiment, the means 54 for frequency processing are placed between means the 48 and means 50. Furthermore, the frequency processing means 54 include means 70 for mixing the noisy reference signal S$_2$ with the conversion signal and the conducted noise B$_C$ with a different conversion signal. The means 70 for mixing are connected to each other such that the intermediate frequencies of the signals coming from means 70 are compatible, actually identical.

The invention is not limited to the previously described embodiments.

The device could comprise a single conducted noise sensor used for noise correction of the received radio signal in the car.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

This application claims the benefit of French Patent Application FR 0958492 filed Nov. 30, 2009, the entire disclosure of which is incorporated by reference herein.

| [Reference Signs List] | |
| --- | --- |
| 10 | Installation environment |
| 12 | Vehicle |
| 14 | Electric energy source |
| 16 | Battery |
| 18 | Source |
| 20 | Energy converter |
| 22 | Device |
| 24 | Electric portion |
| 26 | Mean |
| 26B$_1$, 26B$_2$, 26B$_3$ | Conductor phase wire |
| 28 | Device |
| 30 | Antenna |
| 32 | Tuner |
| 33 | Unit |
| 40 | Mean |
| 44, 44A, 44B, 44B$_1$, 44B$_2$, 44B$_3$, 44B$_4$ | Sensor |
| 46 | Filter |
| 48 | Mean |
| 50 | Mean |
| 52 | Filter |
| 53 | Mean |
| 54 | Mean |
| 56 | Mean |
| 58 | Mean |
| 60 | Mean |
| 62 | Mean |
| 64 | Mean |
| 66 | Mean |
| 68 | Mean |
| 70 | Mean |
| 72 | Coil |
| 74 | Support |
| 76 | Protective coating |

-continued

| [Reference Signs List] | |
|---|---|
| 78 | End |
| 80 | End |
| 82 | Sleeve |
| 84 | Insulated electric cable |
| 86 | Mean |
| 88 | Capacitor |
| 90 | Resistor |

The invention claimed is:

1. A device for electromagnetic noise reduction in a hybrid automotive vehicle, comprising:
   at least one sensor that measures a conducted noise generated by at least one noise source;
   a reducer that reduces a radiated noise, referred to as modified, on a signal of interest made noisy by the modified radiated noise, where the reducer includes a determiner that determines a noise corrected signal of interest from a noisy signal of interest, where the determiner includes an estimator that estimates the modified radiated noise from the conducted noise; and
   a selector that selects a frequency for receiving a radiofrequency signal.

2. The device according to claim 1, wherein the sensor includes a Rogowski type coil.

3. The device according to claim 1, wherein the estimator includes an adaptive filter.

4. The device according to claim 1, further comprising a converter that converts the noisy signal of interest or the measured conducted noise measured in an analogue mode into a digital mode, wherein the converter is arranged upstream of the determiner that determines the noise corrected signal of interest.

5. The device according to claim 1, further comprising a mixer that mixes the noisy signal of interest, the measured conducted noise or the noise corrected signal of interest with a conversion signal including a conversion frequency, into a noisy intermediate signal of interest, a measured conducted intermediate noise or a noise corrected intermediate signal of interest having a single intermediate frequency.

6. The device according to claim 5, in which the mixer and the selector are shared.

7. An assembly comprising:
   at least one noise source that includes an energy converter and a DC-DC converter; and
   at least one noise reduction device, wherein the at least one noise reduction device comprising:
      at least two sensors that measure a conducted noise generated by the at least one noise source;
      a reducer that reduces a radiated noise, referred to as modified, on a signal of interest made noisy by the modified radiated noise, where the reducer includes a determiner that determines a noise corrected signal of interest from a noisy signal of interest, where the determiner includes an estimator that estimates the modified radiated noise from the conducted noise;
      a selector that selects a frequency for receiving a radiofrequency signal;
      one of the at least two sensors placed between the energy converter and the DC-DC converter; and
      another of the at least two sensors placed between the energy converter and an electric motor.

8. An electromagnetic noise reduction process in a hybrid automotive vehicle, comprising:
   at least one conducted noise generated by at least one noise source is measured; and
   a radiated noise, referred to as modified, on a signal of interest made noisy by a modified radiated signal, is estimated from the at least one conducted noise, where the modified radiated noise is obtained from the radiated noise, referred to as initial, generated by the noise source and modified by an environment of a device,
   wherein a noise corrected signal of interest is determined from a noisy signal of interest and the estimate of the modified radiated noise.

* * * * *